Oct. 16, 1923.

D. BARTMAN

POULTRY ROOST

Filed Dec. 19, 1922

1,470,799

Inventor
Daniel Bartman

By Lacy & Lacy, Attorneys

Patented Oct. 16, 1923.

1,470,799

UNITED STATES PATENT OFFICE.

DANIEL BARTMAN, OF LARNED, KANSAS.

POULTRY ROOST.

Application filed December 19, 1922. Serial No. 607,889.

*To all whom it may concern:*

Be it known that I, DANIEL BARTMAN, a citizen of the United States, residing at Larned, in the county of Pawnee and State of Kansas, have invented certain new and useful Improvements in Poultry Roosts, of which the following is a specification.

This invention seeks to provide a roost or perch for poultry which will be always in a sanitary condition and by which disinfectants may be applied to the fowls without injury or discomfort to the same so as to destroy vermin which tend to feed upon the fowls. The invention seeks to provide a device for the stated purpose which will be durable but inexpensive while proving efficient for the purposes for which it is designed. The invention is illustrated in the accompanying drawing and will be hereinafter fully set forth.

Figure 1:
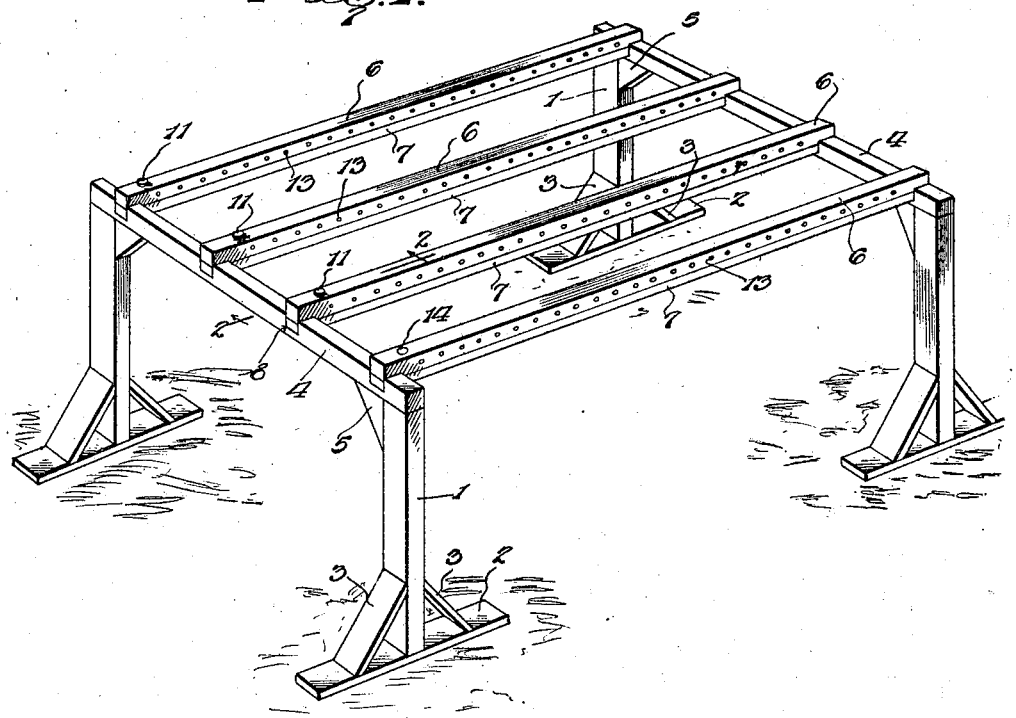
Figure 1 is a perspective view of a roost embodying my improvements.
Figure 2:
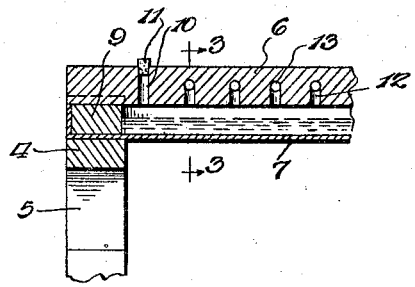
Fig. 2 is an enlarged detail longitudinal section on the line 2—2 of Fig. 1.
Figure 3:
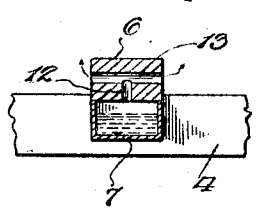
Fig. 3 is an enlarged detail transverse section on the line 3—3 of Fig. 2.

In carrying out my invention, I employ a supporting structure which consists essentially of legs or posts 1 arranged in rectangular relation and each provided at its lower end with a foot 2 adapted to rest upon the floor of the poultry house. The feet are rigidly connected with the posts or legs by braces 3, and the upper ends of the legs are connected in pairs by cross bars 4, as clearly shown, bracing blocks 5 being secured in the angles defined by the cross bars and the legs so as to reinforce the structure as is obvious. Perches or roosting bars 6 are extended between and supported by the cross bars 4, and these perches or roosting bars are preferably of wood having their ends supported directly by the said cross bars. Extending longitudinally of the several perches and directly beneath the same are pans or troughs 7, the ends of which are adapted to fit in recesses 8 formed in the upper sides of the cross bars 4, and blocks or plugs 9 of any convenient construction are fitted in the ends of these pans or troughs so as to close the same and support the perches above the bottoms of the troughs. Each perch is provided at one or both ends with an opening 10 extending vertically therethrough which may be closed by a plug or stopper 11 and through which any disinfectant is poured into the pan or trough. Each perch is further provided with a longitudinal series of openings 12 extending upwardly from its lower side and communicating directly with cross passages 13 formed through the perches, as will be readily understood on reference to Fig. 3.

The perches with the associated pans or troughs are fitted in corresponding recesses in the cross bars 4 and are thereby supported in operative position. A volatile disinfectant is poured through the filling openings 10 of the several perches into the respective troughs and the filling openings are closed. The disinfectant will evaporate and the vapor will rise through the several openings 12 and escape through the passages 13 so that it will permeate the feathers of the fowls using the roost and will relieve the fowls of all vermin with which they may be infested. As the evaporation will be slow, the vapors will not injuriously affect the fowls but will prove efficacious in destroying the vermin. My device is exceedingly simple and obviously inexpensive. When set up for use, it will be firm and, as it is of an open construction, it may be easily cleaned so that it may be kept in a sanitary condition.

It will be readily noted that the perches are at least as wide as the troughs so that they extend over the entire top area of the troughs and, therefore, serve as covers and guards for the same. Moreover, there are no openings through the tops of the perches, except the filling openings which are normally closed, and, as a result, nothing that may happen to drop upon the perch can find its way into the trough and defile the contents of the same or choke the passages which are provided to permit escape of the disinfecting vapors. The device is, therefore, in an operative condition at all times.

It will be understood that the closure for the filling opening may be of convenient form, and at 14 I have indicated a metal lid fitting in the opening.

Having thus described the invention, what is claimed as new is:

1. In a roost, the combination of spaced supports, perches extending between the supports and provided with longitudinal series of openings in their bottoms and cross passages opening through their opposite sides and communicating directly with the first-mentioned openings, and troughs supported by the spaced bars immediately below and against the under sides of the perches and adapted to contain a disinfectant.

2. A roost comprising pairs of uprights, supporting bars carried by the upper ends of the uprights in each pair and provided with recesses in their upper sides, troughs extending between said bars and having their ends resting in the recesses in the same and adapted to contain a disinfectant, perches extending longitudinally of and immediately over the respective troughs, filling openings in the perches, closures for said openings, longitudinal series of openings in the bottoms of the perches, and cross passages through the perches opening through the sides of the same and communicating with the said openings.

In testimony whereof I affix my signature.

DANIEL BARTMAN. [L. S.]